(12) United States Patent
Foebel et al.

(10) Patent No.: US 9,959,310 B2
(45) Date of Patent: May 1, 2018

(54) ACCESSING SINGLE ENTITIES IN ODATA ENTITY SETS

(71) Applicants: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(72) Inventors: Florian Foebel, Burstadt (DE); Bjoern Friedmann, Rheinmunster (DE); Boris Gruschko, Heidelberg (DE); Christian Mohr, Heidelberg (DE); Martin Strenge, Berlin (DE); Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 14/318,898

(22) Filed: Jun. 30, 2014

(65) Prior Publication Data

US 2015/0149445 A1 May 28, 2015

Related U.S. Application Data

(60) Provisional application No. 61/908,710, filed on Nov. 25, 2013.

(51) Int. Cl.
*G06F 17/30* (2006.01)
*H04L 12/26* (2006.01)
(Continued)

(52) U.S. Cl.
CPC .... *G06F 17/30371* (2013.01); *G06F 11/3668* (2013.01); *G06F 17/30289* (2013.01);
(Continued)

(58) Field of Classification Search
USPC ........................................ 707/722
See application file for complete search history.

(56) References Cited

U.S. PATENT DOCUMENTS

2013/0046894 A1\* 2/2013 Said .................. G06F 9/547
709/226
2014/0006368 A1\* 1/2014 Moser ............... G06F 17/30386
707/705

(Continued)

*Primary Examiner* — Fred I Ehichioya
*Assistant Examiner* — Johnese Johnson
(74) *Attorney, Agent, or Firm* — Buckley, Maschoff & Talwalkar LLC (57) ABSTRACT

A system includes activation of an OData service exposing a parameterized database view, the OData service exposing a Parameter Entity Type and a Result Entity Type, wherein the Parameter Entity Type specifies one or more input parameters of the database view as properties of the Parameter Entity Type, and defines a Parameter Entity Type key formed by each of the one or more input parameters, and wherein the Result Entity Type specifies the one or more input parameters and one or more output of the database view as properties of the Result Entity Type, and defines a Result Entity Type key formed by each of the one or more input parameters and at least one of the one or more output parameters. Also included is reception of an OData request comprising a Uniform Resource Indicator, the Uniform Resource Indicator including the OData service, the Result Entity Type, and a value for each of one or more input parameters of the database view and for at least one of the one or more output parameters of the database view, and execution, in response to the request, of the OData service to return a single entity associated with the values.

15 Claims, 7 Drawing Sheets

(51) Int. Cl.
*G06F 11/36* (2006.01)
*H04L 29/08* (2006.01)
G06F 21/62 (2013.01)
H04L 29/06 (2006.01)

(52) U.S. Cl.
CPC .. *G06F 17/30303* (2013.01); *G06F 17/30864* (2013.01); *H04L 43/10* (2013.01); *H04L 63/083* (2013.01); *H04L 67/02* (2013.01); *G06F 21/6218* (2013.01); *H04L 63/08* (2013.01)

(56) References Cited

U.S. PATENT DOCUMENTS

| | | | |
|---|---|---|---|
| 2014/0337815 A1* | 11/2014 | Erlewein | G06F 8/30 717/106 |
| 2015/0006732 A1* | 1/2015 | Schmidt | H04L 47/726 709/226 |
| 2015/0074037 A1* | 3/2015 | Sarferaz | G06F 17/3056 707/602 |
| 2015/0120701 A1* | 4/2015 | Schmidt | G06F 17/3089 707/722 |

* cited by examiner

ACCESSING SINGLE ENTITIES IN ODATA ENTITY SETS

CROSS REFERENCE TO RELATED APPLICATIONS

This application claims benefit to and priority of U.S. Patent Application Ser. No. 61/908,710, filed Nov. 25, 2013, the contents of which are hereby incorporated by reference in their entirety for all purposes.

BACKGROUND

According to conventional Web-based architectures, a client application (e.g., a Web browser) requests information from a Web server, the Web server retrieves the information from a database system (e.g., via an intermediate application server), and the Web server provides the information to the client application.

Open Data Protocol (OData) is a resource-based Web protocol for querying and updating data. Accordingly, a Web-based client may use the OData protocol to retrieve data stored in a database system, as long as the database system (and/or an intermediate application server) supports the OData protocol. However, the OData protocol does not provide an efficient mechanism for accessing single entities of a parameterized entity set.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
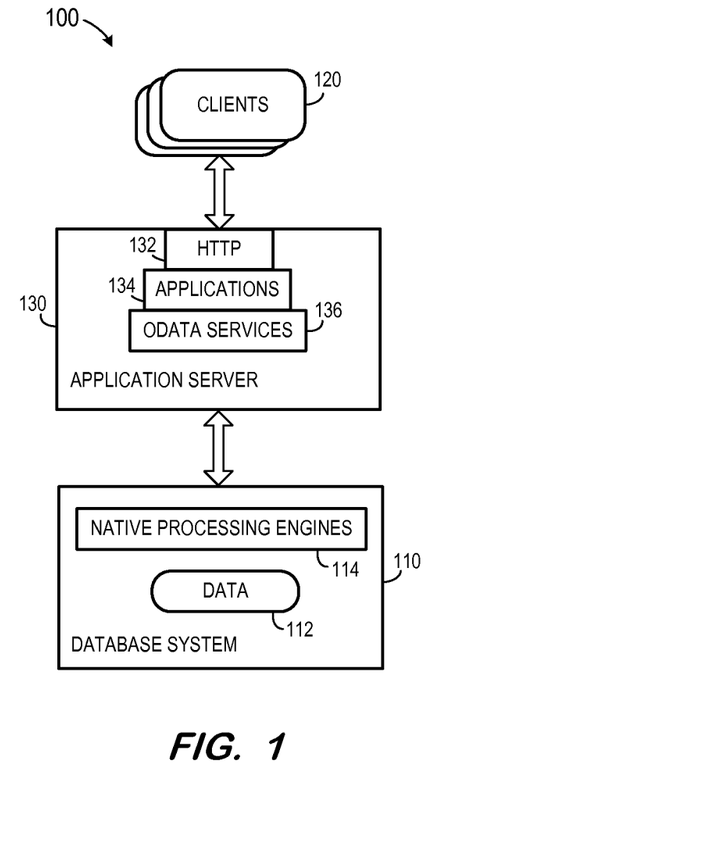
FIG. 1 is a block diagram of a system according to some embodiments.

FIG. 1 is a block diagram of system 100 according to some embodiments. System 100 includes database system 110, clients 120, and application server 130. Generally, application server 130 receives queries from clients 120 and provides results to clients 120 based on data of database system 110. Database system 110 and application server 130 may support multi-tenancy to separately support multiple unrelated clients by providing multiple logical database systems which are programmatically isolated from one another.

Database system 110 implements an "in-memory" database, in which data 112 represents a full database stored in volatile (e.g., non-disk-based) memory (e.g., Random Access Memory). The full database may be persisted in and/or backed up to fixed disks (not shown). Embodiments are not limited to an in-memory implementation. For example, data 112 may be stored in one or more fixed disks (e.g., persistent memory for storing their respective portions of the full database) and accessed during operation when needed.

Database system 110 may comprise any query-responsive data source or sources that are or become known, including but not limited to a structured-query language (SQL) relational database management system. Database system 110 may comprise a relational database, a multi-dimensional database, an eXtendable Markup Language (XML) document, or any other data storage system storing structured and/or unstructured data. Database system 110 may be distributed among several relational databases, dimensional databases, and/or other data sources. Embodiments are not limited to any number or types of data sources.

In some embodiments, data 112 may comprise one or more of conventional tabular data, row-based data, column-based data, and object-based data. Moreover, data 112 may be indexed and/or selectively replicated in an index to allow fast searching and retrieval thereof.

Database system 110 includes native processing engines 114, for example, for processing SQL statements received from application server 130. An SQL processing engine may perform table joins, etc. which are required to respond to an incoming SQL statement. Native processing engines 114 may include one or more engines for executing any standardized or proprietary scripting language. Such an engine may therefore provide execution of data-intensive application logic within database system 110.

SQL other scripting languages may be implemented using a common infrastructure of built-in data engine functions which have access to various metadata, such as definitions of relational tables, columns, views, and indexes, and definitions of script procedures. Database system 110 may additionally provide a framework for the installation of functional libraries which are integrated with different ones of processing engines 114.

Application server 130 includes HTTP interface 132 through which clients 120 may communicate with application server 130. According to the illustrated embodiment, application server 130 provides a set of embedded system services which support applications 134 executing on server 130. The system services may be used by these server applications 134 to expose the data model of database system 110 to clients 120, including its tables, views and database procedures. In addition to exposing the data model, application server 130 may host system services such as a search service. The system services may also provide a lightweight web server, server-side JavaScript execution and access to SQL and other scripting language functions, and configurable support for OData (i.e., OData services 136).

OData services 136 expose an end point that allows applications 134 to access data 112. OData services 136 implement the OData protocol and map data 112 between its underlying form (e.g., database tables, spreadsheet lists, etc.) and a format that the requesting client can understand.

OData defines an abstract data model and a protocol which, together, enable any client to access data exposed by any data source via a Uniform Resource Indicator (URI). The data model provides a generic way to organize and describe data. OData uses the Entity 1 Data Model (EDM).

The OData protocol is a set of interactions which includes the REST-based create, read, update, and delete operations along with an OData-defined query language. OData defines operations on resources using HTTP commands (for example, GET, PUT, POST, and DELETE) and specifies the URI syntax which is used to identify the resources. The OData service sends data in either in XML-based format defined by Atom/AtomPub or using JavaScript Object Notation (JSON).

Each of clients 120 may comprise one or more devices executing program code of a software application for presenting user interfaces to allow interaction with application server 130. Presentation of a user interface may comprise any degree or type of rendering, depending on the type of user interface code generated by application server 130. For example, a client 120 may execute a Web Browser to request and receive a Web page (e.g., in HTML format) from application server 130 via HTTP or HTTPS, and may render and present the Web page according to known protocols. One or more of clients 120 may also or alternatively present user interfaces by executing a standalone executable file (e.g., an .exe file) or code (e.g., a JAVA applet) within a virtual machine.

Figure 2:
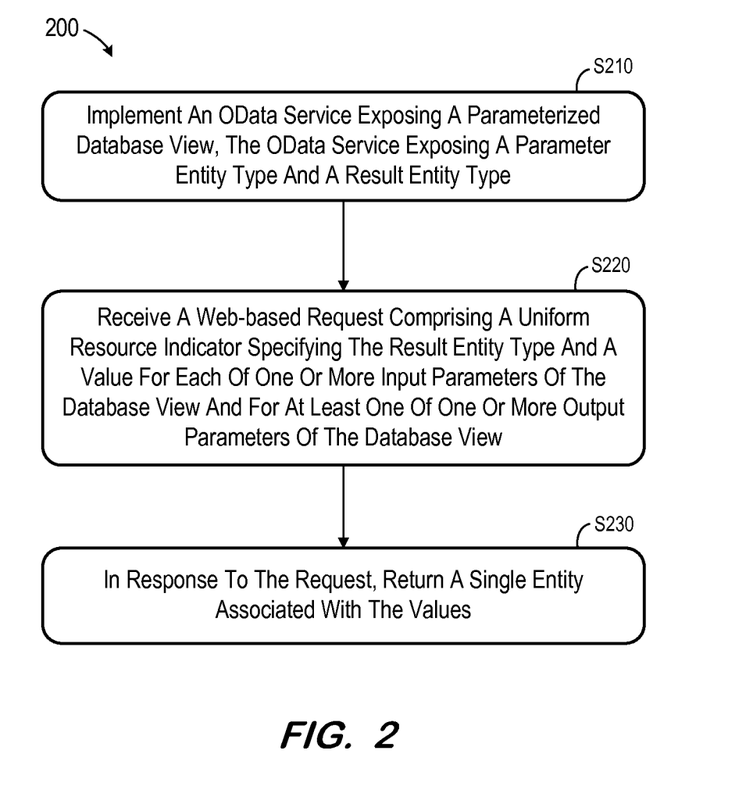
FIG. 2 is a flow diagram of a process according to some embodiments.

FIG. 2 is a flow diagram of process 200 according to some embodiments. All processes mentioned herein may be executed by various hardware elements and/or embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, an OData service is activation at S210. As is known in the art, activation of an OData service may include creation of a view to be exposed by the OData service, creation of an OData service definition for the OData service, and compilation of these items into run-time artifacts. The OData service definition specifies the database views to be exposed as OData collections. A view may be exposed using the view's repository (i.e., design-time) name or the view's database catalog (i.e., run-time) name.

The OData service definition also may include associations to express relationships between entities, and specifies the columns of a view which will form the key for the view. Moreover, the OData service definition allows generation of Parameter Entity Sets for both calculation views and analytic views by adding 'parameters via entity' to the entity, as illustrated in the following service-definition example:

```
service {
    "sample.odata::calc" as "CalcView"
        keys generate local "ID"
        parameters via entity;
```

During activation of the entity set, the specified parameters are retrieved from the metadata of the view and exposed as a new EntitySet named after the entity set name and the suffix Parameters, for example, CalcViewParameters. A NavigationProperty named Results is generated to retrieve the results from the parameterized call.

The OData service activated at S210 exposes a Parameter Entity Type and a Result Entity Type. The Parameter Entity type includes one or more input parameters of the database view as properties, and defines a key formed by each of the one or more input parameters. The Result Entity Type includes the one or more input parameters and one or more output parameters of the database view as properties, and defines a key formed by each of the one or more input parameters and at least one of the one or more output parameters.

Figure 3:
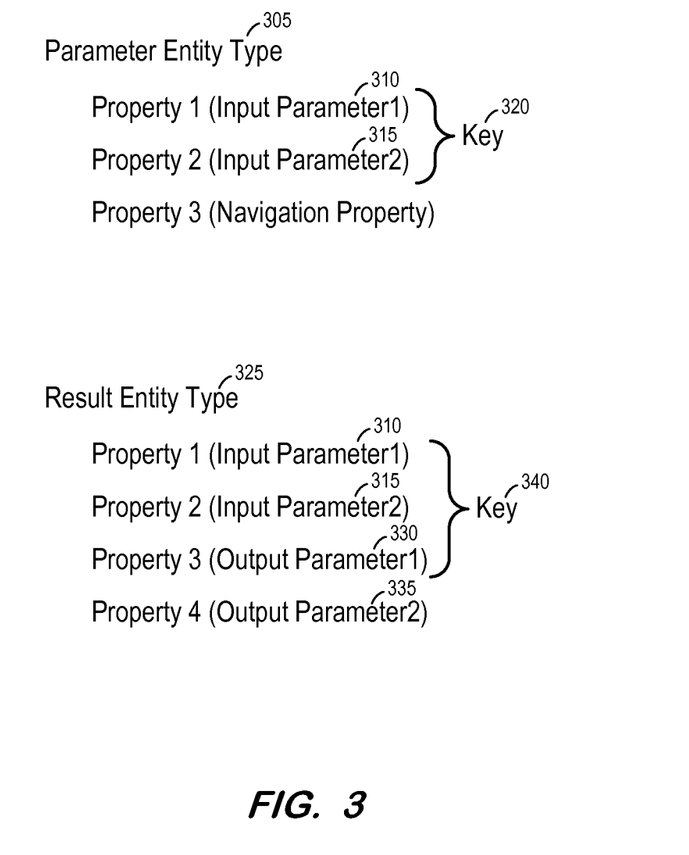
FIG. 3 illustrates a type of a Parameter Entity Set and a type of a Result Entity set according to some embodiments.

FIG. 3 illustrates properties and keys of a Parameter Entity Type and a Result Entity Type according to some embodiments. Embodiments are not limited to the number of input parameters and output parameters shown in FIG. 3. As shown, Parameter Entity Type 305 includes input parameters 310 and 315 as Property 1 and Property 2, respectively, and defines a key 320 formed by each of the one or more input parameters. Result Entity Type 325 includes input parameters 310 and 315 as Property 1 and Property 2, respectively, and includes output parameters 330 and 335 as Property 3 and Property 4, respectively. Key 340 is formed by input parameters 310 and 315 and output parameter 330.

Parameter Entity Type 305 also includes Property 3 defining a relationship between Parameter Entity Type 305 and Result Entity Type 325, to allow navigation from Parameter Entity Type 305 to Result Entity Type 325.

The following is an example of a $metadata document of an OData service which exposes a calculation view and shares the structure of FIG. 3. The example assumes that the calculation view is associated with two input parameters (i.e., nvarcharParam and integerParam) and with two output parameters (i.e., nvarcharOut and integerOut).

```
<EntityType Name="ScriptPIKParamsType">
    <Key>
        <PropertyRef Name="nvarcharParam" />
        <PropertyRef Name="integerParam" />
    </Key>
    <Property Name="nvarcharParam" Type="Edm.String"
Nullable="false" DefaultValue="nvarchardefault" MaxLength="50" />
    <Property Name="integerParam" Type="Edm.Int32"
Nullable="false" DefaultValue="123" />
    <NavigationProperty Name="Results"
Relationship="sap.test.odata.service.calc.-
ScriptPIKParams__ScriptPIKType"
FromRole="ScriptPIKParamsPrincipal" ToRole="ScriptPIKDependent" />
    </EntityType>
    <EntityType Name="ScriptPIKType">
        <Key>
            <PropertyRef Name="nvarcharParam" />
            <PropertyRef Name="integerParam" />
            <PropertyRef Name="nvarcharOut" />
        </Key>
        <Property Name="nvarcharParam" Type="Edm.String"
Nullable="false" DefaultValue="nvarchardefault" MaxLength="50" />
        <Property Name="integerParam" Type="Edm.Int32"
Nullable="false" DefaultValue="123" />
        <Property Name="nvarcharOut" Type="Edm.String"
Nullable="false" MaxLength="50" />
        <Property Name="integerOut" Type="Edm.Int32" />
    </EntityType>
...
    <EntitySet Name="ScriptPIK"
EntityType="sap.test.odata.service.calc.ScriptPIKType" />
        <EntitySet Name="ScriptPIKParams"
EntityType="sap.test.odata.service.calc.ScriptPIKParamsType" />
```

According to the above example, the Parameter Entity Type "ScriptPIKParamsType" includes input parameters nvarcharParam and integerParam as first and second properties, and defines a key formed by nvarcharParam and integerParam. Result Entity Type "ScriptPIKType" includes input parameters nvarcharParam and integerParam as first and second properties, output parameters nvarcharOut and integerOut as third and fourth properties, and defines a key formed by nvarcharParam, integerParam and nvarcharOut.

Figure 4:
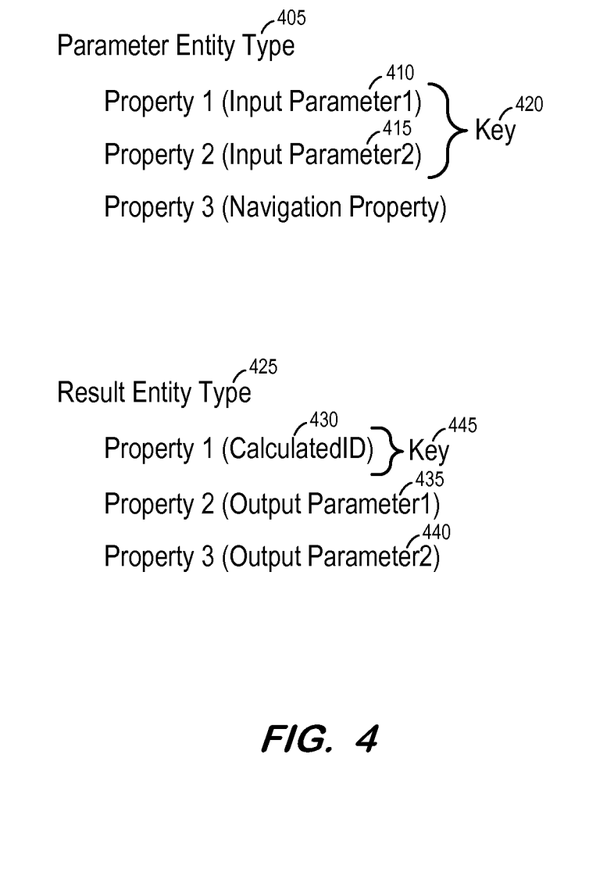
FIG. 4 illustrates a type of a Parameter Entity Set and a type of a Result Entity set.

For comparative purposes, FIG. 4 illustrates a definition of properties and keys of a Parameter Entity Type and a Result Entity Type according to prior art systems. As shown, Parameter Entity Type 405 includes input parameters 410 and 415 as Property 1 and Property 2, respectively, and defines key 420 formed by each of the one or more input parameters.

Result Entity Type 425 includes output parameters 435 and 440 exposed as properties. However, Result Entity Type 425 exposes CalculatedID property 430 as key 445. The value CalculatedID property 430 is uniquely derived from the parameters and keys of the actual query result instance. Consequently, access to instances of the result are only possible via the Parameter Entity Type or by deriving the key, the latter of which requires a user to know the derivation algorithm of the key column.

The following is an example of a $metadata document of an OData service which exposes a calculation view and conforms to the prior art structure shown in FIG. 4. As in the prior example, this example assumes that the calculation view is associated with two input parameters (i.e., nvarcharParam and integerParam) and with two output parameters (i.e., nvarcharOut and integerOut).

```
<EntityType Name="ScriptPIKParamsType">
    <Key>
        <PropertyRef Name="nvarcharParam" />
        <PropertyRef Name="integerParam" />
    </Key>
    <Property Name="nvarcharParam" Type="Edm.String"
Nullable="false" DefaultValue="nvarchardefault" MaxLength="50" />
    <Property Name="integerParam" Type="Edm.Int32"
Nullable="false" DefaultValue="123" />
    <NavigationProperty Name="Results"
Relationship="sap.test.odata.service.calc.-
ScriptPIKParams_ScriptPIKType"
FromRole="ScriptPIKParamsPrincipal" ToRole="ScriptPIKDependent" />
</EntityType>
<EntityType Name="ScriptPIKType">
    <Key>
        <PropertyRef Name="CalculatedID" />
    </Key>
    <Property Name="CalculatedID" Type="Edm.String"
Nullable="false" MaxLength="100" />
    <Property Name="nvarcharOut" Type="Edm.String"
Nullable="false" MaxLength="50" />
    <Property Name="integerOut" Type="Edm.Int32" />
</EntityType>
...
<EntitySet Name="ScriptPIK"
EntityType="sap.test.odata.service.calc.ScriptPIKType" />
<EntitySet Name="ScriptPIKParams"
EntityType="sap.test.odata.service.calc.ScriptPIKParamsType" />
```

According to the above example, the Parameter Entity Type "ScriptPIKParamsType" includes input parameters nvarcharParam and integerParam as first and second properties, and defines a key formed by nvarcharParam and integerParam. In contrast to the prior example, Result Entity Type "ScriptPIKType" includes a CalculatedID as a first property, and output parameters nvarcharOut and integerOut as second and third properties. Moreover, the key of ScriptPIKType is formed solely by CalculatedID.

Returning to process 200, a Web-based request is received at S220. The request may be received by an application 134 from HTTP interface 132, which in turn received the HTTP request from one of clients 120.

The request includes a URI specifying the result entity type exposed by the OData service. The request also specifies a value for each of the one or more input parameters of the database view and for at least one of the output parameters of the database view. In other words, the request projects the parameters of the call as properties (i.e., columns) in the result rather than using a calculated key.

Consequently, a single result entity is accessible via a distinct list of property values within a URI, without requiring generation of a key value.

The following is an example of a URI received at S220 according to some embodiments:

```
http://ld7502:8002/sap/test/odata/service/calc.xsodata/ScriptPIK
(nvarcharParam='hello',integerParam=2,nvarcharOut='hello')
```

Using this URI, the application 134 accesses the corresponding OData service 136 calc.xsodata at S230. Based on the metadata definition of the OData service, an OData handler constructs the required database statements and invokes them using an SQL API. A single entity associated with the parameter values is returned at S230.

In contrast, using the conventional system mentioned above, a single entity may be directly accessed only via a calculated key value (i.e., CalculatedID) as shown:

```
http://ld7502:8002/sap/test/odata/service/calc.xsodata/ScriptPIK
(CalculatedID='|hello|2|hello%20you|')
```

According to some embodiments, the URI for requesting all entities is the same for both systems:

```
http://ld7502:8002/sap/test/odata/service/calc.xsodata/ScriptPIKParams
(nvarcharParam='hello',integerParam=2)/Results
```

Moreover, a URI for requesting a list filtered to include only the single entity is also the same using either system:

```
http://ld7502:8002/sap/test/odata/service/calc.xsodata/ScriptPIKParams
(nvarcharParam='hello',integerParam=2)/Results?$filter=nvarcharOut=
'hello%20you'
```

Embodiments of the features described herein therefore allow direct access of a single entity based only on the parameter values. The Result Entity Set is queried directly using the parameters as keys. The prior system also described herein is only capable of filtering the result and returning a result set including a single entry, if only the parameter values are known.

Figure 5:
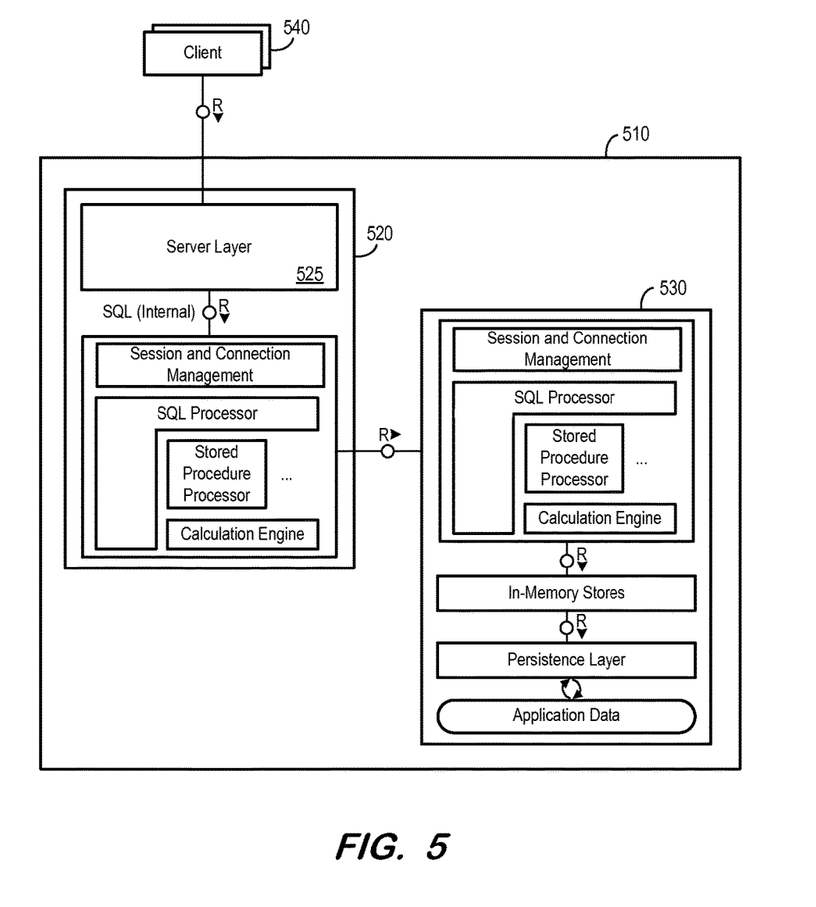
FIG. 5 is a detailed block diagram of a system according to some embodiments.

FIG. 5 illustrates database platform 510 integrating web application server 520 and index server 530 according to some embodiments. Web application server 520 may enable execution of server applications completely on database platform 510, without the need for an additional application server. Database platform 510 may therefore comprise an implementation of database system 110 and application server 130 of FIG. 1.

Clients 540 send their requests to database platform 510 via HTTP or HTTPS. Clients 540 may be Web browsers, mobile applications, or other applications that consume resources and services provided by server applications. According to some embodiments, the presentation logic is run on clients 540.

Server 520 runs services that accept the HTTP requests and maps them to database queries and stored procedure calls. As described above, the HTTP requests may include OData requests, and the services may include OData services and validation exits. Data-intensive logic may be executed in index server 530 (using SQL, SQLScript, views, L procedures, C++, etc.).

In this regard, web application server 520 can be viewed as an index server with server layer 525 on top. However, according to some embodiments, no application data is stored in Web application server 520 itself. If server layer 525 needs to access tables or views or needs to call a stored procedure, it uses the illustrated internal SQL API to open a local database connection and then sends an SQL statement to the SQL processor in the web application server 520. The statement is processed by the SQL processor or by the calculation engine of web application server 510.

The SQL processor and the calculation engine delegate the execution to the index server 530 which manages the required data. This delegation may be similar to the mechanism used in a distributed database system including multiple index servers. In contrast, however, web application server 520 delegates the execution of database operations because it does not store application tables. Integration of server 520 into database platform 510 may lead to simplified administration and a better development experience.

Figure 6:
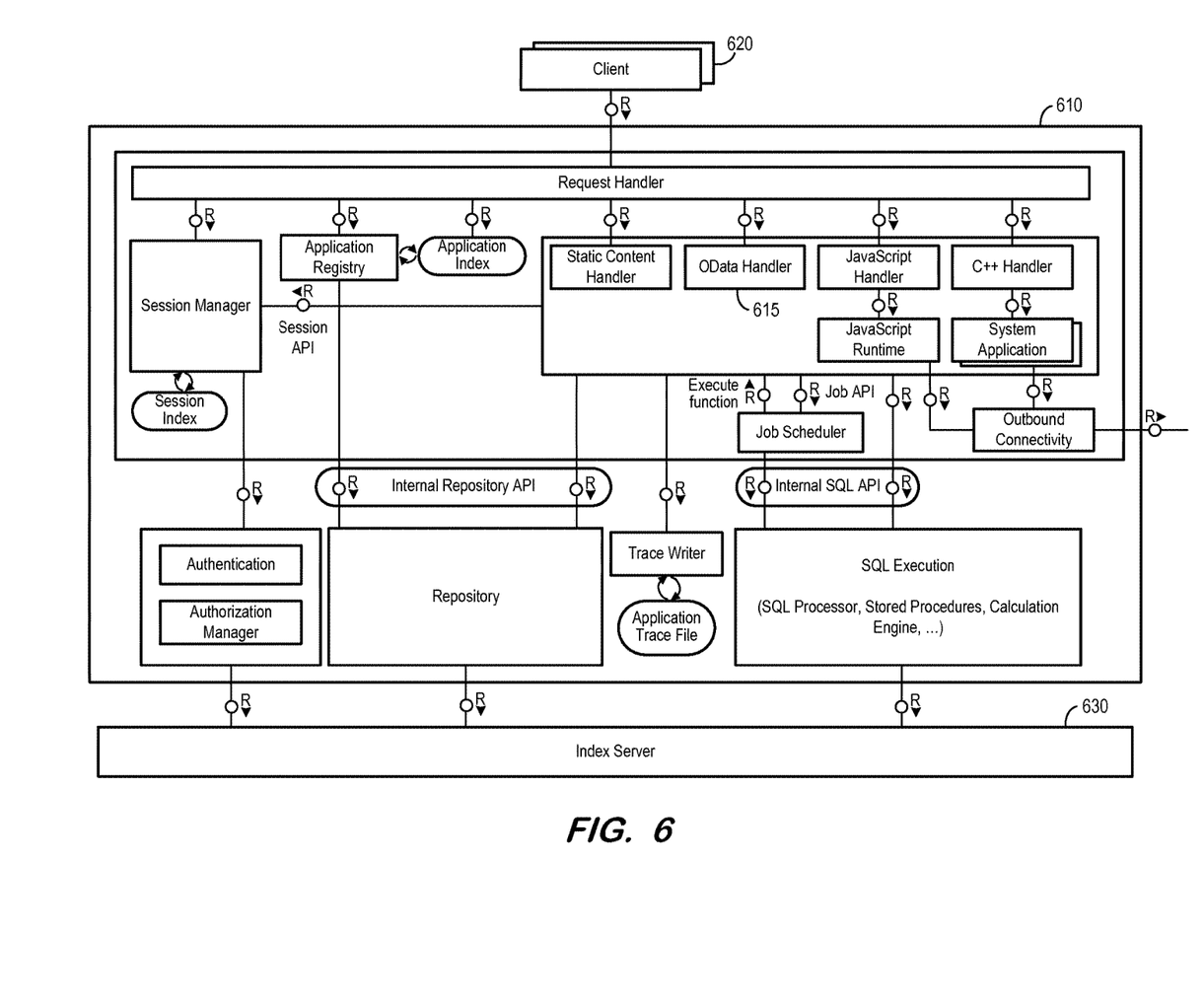
FIG. 6 is a detailed block diagram of a system according to some embodiments.

FIG. 6 is a detailed block diagram of Web application server 610 according to some embodiments. Server 610 may comprise an implementation of application server 130 of FIG. 1, while index server 630 may comprise an implementation of database system 110.

Incoming requests from clients 620 are received by the request handler. The request handler first determines the application to which the requested resource belongs by invoking the application registry, which maintains a list of all active applications. The application registry initially reads this information from runtime storage tables located in the master index server and caches the information in its application index. After the application is determined, optional Uniform Resource Locator (URL) rewriting rules are applied. URL rewriting rules can be defined for each application to map between external URLs and corresponding internal technical URLs.

The request handler then invokes the session manager. The session manager either relates the request to an existing session or starts a new session. The session manager is responsible for session authentication. A developer may specify, on the package level, whether authentication is required for accessing the resources. Server 610 may support several authentication mechanisms, including but not limited to SAML, SAP assertion ticket, SAP logon ticket, Kerberos, X.509 certificates, and user and password using HTTP basic authentication or form-based logon.

After successful authentication, the request handler forwards the request to the responsible resource handler of server 610. FIG. 6 illustrates several different resource handlers for different types of resources.

The static content handler is called for content such as Hypertext Markup Language (HTML) files, client side scripts, or images. The static content handler retrieves the resources from the runtime storage.

OData handler 615 is invoked if the requested resource belongs to an OData service. If the client requests the service definition, OData handler 615 returns a document including the metadata about the service. This document is generated during the activation of the service descriptor which was written by the developer. If the client requests actual data, the OData handler constructs the required database statements and invokes them using the internal SQL API. The OData handler transforms the query results into the format requested by the client, which can be either Atom (content type "atom+XML") or JSON.

The JavaScript handler is invoked if the requested resource is a server-side JavaScript program. The JavaScript handler reads the runtime object with the JavaScript byte code from the runtime storage tables, and invokes the JavaScript runtime for executing it. The JavaScript runtime also contains an implementation of JavaScript APIs. If such an API is called, the JavaScript runtime invokes the responsible component, such as the session manager, the outbound HTTP client, the trace writer, or the internal SQL API.

The outbound HTTP client is used to send HTTP/S requests to an external server. The connection details of the remote server need to be specified in advance by creating an HTTP destination configuration. The internal SQL API invokes an SQL execution chain. The SQL executor and the calculation engine in server 610 delegate the actual data operations to the index server where the data resides.

The C++ handler is responsible for resources and services exposed by system applications that are written in C++. These system applications have the same lifecycle as the database platform and are part of the database build. One example is a Direct Extractor Connection (DXC) that allows DataSource extractor-based data replication between clients and the database platform via HTTP. DataSource extractors in the client are redirected to send extracted data to the database platform system via HTTP. The data is received by the DXC system application in the XS server, which stores it in the database.

Figure 7:
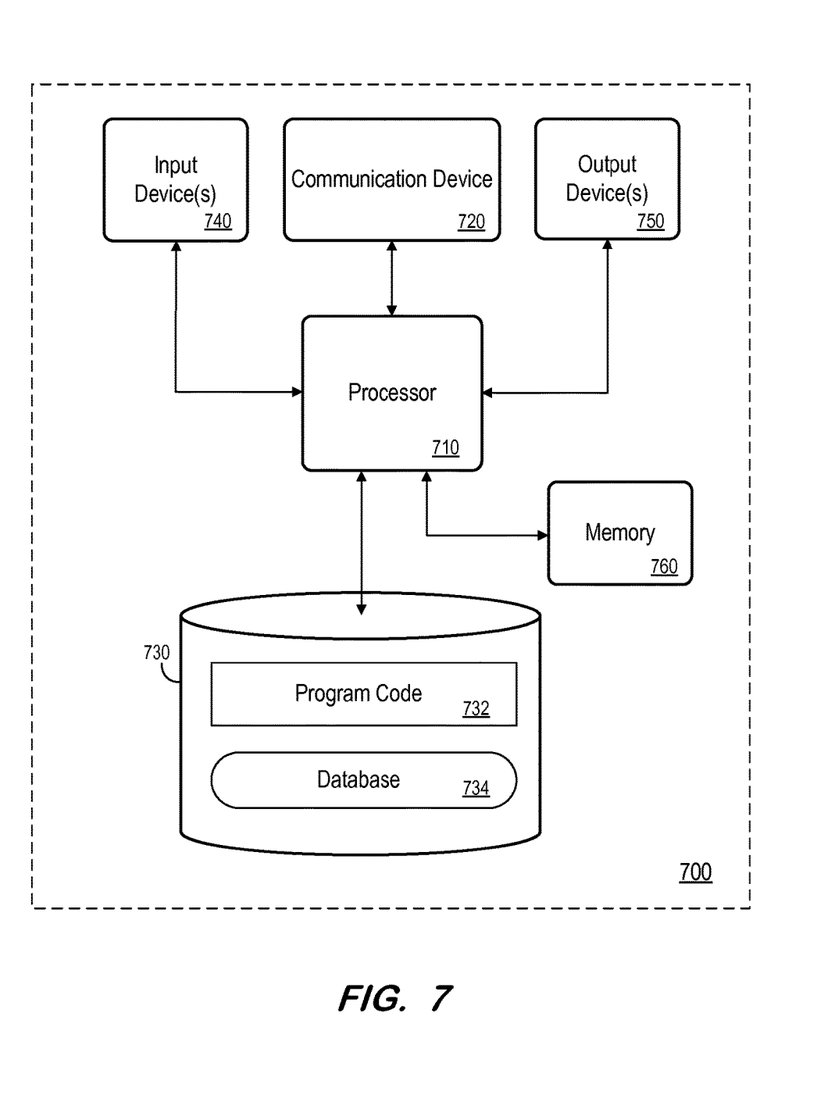
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of application server 130 and database system 110 of FIG. 1 in some embodiments. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Program code 732 may comprise program code executed by processor 710 to cause apparatus 700 to perform any one or more of the processes described herein. Embodiments are not limited to execution of these processes by a single apparatus. Database 734 may include database data as described above. As also described above, database data (either cached or a full database) may be stored in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a database storing data; and
   a processor to execute processor-executable process steps to cause the system to:
   activate an OData service by creating an OData service definition for the OData service, the OData service definition specifying a database view, the OData service definition including generation of a Parameter Entity Type and a Result Entity Type, wherein the Parameter Entity Type specifies one or more input parameters of the database view as properties of the Parameter Entity Type, the OData service definition defining a Parameter Entity Type key formed from each of the one or more input parameters, and wherein the Result Entity Type specifies the one or more input parameters and one or more output of the database view as properties of the Result Entity Type, and the OData service definition defining a Result Entity Type key formed from each of the one or more input parameters and at least one of the one or more output parameters;
   receive an OData request comprising a Uniform Resource Indicator, the Uniform Resource Indicator including the OData service, the Result Entity Type, and a value for each of one or more input parameters of the database view and for at least one of the one or more output parameters of the database view; and
   in response to the request, execute the OData service to return a single entity associated with the values.

2. The system according to claim 1, wherein execution of the OData service comprises:
   execution of an OData handler to construct database statements based on a metadata definition of the OData service, and to invoke the database statements using a Structured Query Language Application Programming Interface.

3. The system according to claim 1, the processor to further execute processor-executable process steps to cause the system to:
   receive a second OData request comprising a second Uniform Resource Indicator, the second Uniform Resource Indicator including the OData service, the Parameter Entity Type, a value for each of one or more input parameters of the database view, and a filter value of at least one of the one or more output parameters of the database view; and
   in response to the second request, execute the OData service to return a list comprising a single entry associated with the values.

4. The system according to claim 3, the processor to further execute processor-executable process steps to cause the system to:
   receive a third OData request comprising a second Uniform Resource Indicator, the third Uniform Resource Indicator including the OData service, the Parameter Entity Type, and a value for each of one or more input parameters of the database view; and
   in response to the third request, execute the OData service to return a set of all entities of the database view which are associated with the values.

5. The system according to claim 1, the processor to further execute processor-executable process steps to cause the system to:
   receive a second OData request comprising a second Uniform Resource Indicator, the second Uniform Resource Indicator including the OData service, the Parameter Entity Type, and a value for each of one or more input parameters of the database view; and
   in response to the second request, execute the OData service to return a set of all entities of the database view which are associated with the values.

6. A computer-implemented method comprising:
   activating an OData service by creating an OData service definition for the OData service, the OData service definition specifying a database view, the OData service definition including generation of a Parameter Entity Type and a Result Entity Type, wherein the Parameter Entity Type specifies one or more input parameters of the database view as properties of the Parameter Entity Type, the OData service definition defining a Parameter Entity Type key formed from each of the one or more input parameters, and wherein the Result Entity Type specifies the one or more input parameters and one or more output of the database view as properties of the Result Entity Type, and the OData service definition defining a Result Entity Type key formed from each of the one or more input parameters and at least one of the one or more output parameters;
   receiving an OData request comprising a Uniform Resource Indicator, the Uniform Resource Indicator including the OData service, the Result Entity Type, and a value for each of one or more input parameters of the database view and for at least one of the one or more output parameters of the database view; and
   in response to the request, executing the OData service to return a single entity associated with the values.

7. The computer-implemented method according to claim 6, wherein executing the OData service comprises:
   executing an OData handler to construct database statements based on a metadata definition of the OData service, and to invoke the database statements using a Structured Query Language Application Programming Interface.

8. The computer-implemented method according to claim 6, further comprising:

receiving a second OData request comprising a second Uniform Resource Indicator, the second Uniform Resource Indicator including the OData service, the Parameter Entity Type, a value for each of one or more input parameters of the database view, and a filter value of at least one of the one or more output parameters of the database view; and in response to the second request, executing the OData service to return a list comprising a single entry associated with the values.

9. The computer-implemented method according to claim 8, further comprising:

receiving a third OData request comprising a second Uniform Resource Indicator, the third Uniform Resource Indicator including the OData service, the Parameter Entity Type, and a value for each of one or more input parameters of the database view; and in response to the third request, executing the OData service to return a set of all entities of the database view which are associated with the values.

10. The computer-implemented method according to claim 6, further comprising:

receiving a second OData request comprising a second Uniform Resource Indicator, the second Uniform Resource Indicator including the OData service, the Parameter Entity Type, and a value for each of one or more input parameters of the database view; and in response to the second request, executing the OData service to return a set of all entities of the database view which are associated with the values.

11. A non-transitory computer-readable medium storing program code, the program code executable by a computer system to cause to the computer system to:

activate an OData service by creating an OData service definition for the OData service, the OData service definition specifying a database view, the OData service definition including generation of a Parameter Entity Type and a Result Entity Type, wherein the Parameter Entity Type specifies one or more input parameters of the database view as properties of the Parameter Entity Type, the OData service definition defining a Parameter Entity Type key formed from each of the one or more input parameters, and wherein the Result Entity Type specifies the one or more input parameters and one or more output of the database view as properties of the Result Entity Type, and the OData service definition defining a Result Entity Type key formed from each of the one or more input parameters and at least one of the one or more output parameters;

receive an OData request comprising a Uniform Resource Indicator, the Uniform Resource Indicator including the OData service, the Result Entity Type, and a value for each of one or more input parameters of the database view and for at least one of the one or more output parameters of the database view; and in response to the request, execute the OData service to return a single entity associated with the values.

12. The non-transitory computer-readable medium according to claim 11, wherein execution of the OData service comprises:

execution of an OData handler to construct database statements based on a metadata definition of the OData service, and to invoke the database statements using a Structured Query Language Application Programming Interface.

13. The non-transitory computer-readable medium according to claim 11, the program code further executable by a computer system to cause to the computer system to:

receive a second OData request comprising a second Uniform Resource Indicator, the second Uniform Resource Indicator including the OData service, the Parameter Entity Type, a value for each of one or more input parameters of the database view, and a filter value of at least one of the one or more output parameters of the database view; and in response to the second request, execute the OData service to return a list comprising a single entry associated with the values.

14. The non-transitory computer-readable medium according to claim 13, the program code further executable by a computer system to cause to the computer system to:

receive a third OData request comprising a second Uniform Resource Indicator, the third Uniform Resource Indicator including the OData service, the Parameter Entity Type, and a value for each of one or more input parameters of the database view; and in response to the third request, execute the OData service to return a set of all entities of the database view which are associated with the values.

15. The non-transitory computer-readable medium according to claim 11, the program code further executable by a computer system to cause to the computer system to:

receive a second OData request comprising a second Uniform Resource Indicator, the second Uniform Resource Indicator including the OData service, the Parameter Entity Type, and a value for each of one or more input parameters of the database view; and in response to the second request, execute the OData service to return a set of all entities of the database view which are associated with the values.

* * * * *